United States Patent
Brown et al.

(10) Patent No.: US 6,804,737 B2
(45) Date of Patent: Oct. 12, 2004

(54) METHODS AND SYSTEMS FOR INTELLIGENT I/O CONTROLLER WITH CHANNEL EXPANDABILITY VIA MASTER/SLAVE CONFIGURATION

(75) Inventors: Andrew Carl Brown, Colorado Springs, CO (US); Russell Andrew Johnson, Monument, CO (US)

(73) Assignee: LSI Logic Corporation, Milpitas, CA (US)

( * ) Notice: Subject to any disclaimer, the term of this patent is extended or adjusted under 35 U.S.C. 154(b) by 609 days.

(21) Appl. No.: 09/748,324

(22) Filed: Dec. 26, 2000

(65) Prior Publication Data

US 2002/0083249 A1 Jun. 27, 2002

(Under 37 CFR 1.47)

(51) Int. Cl.[7] .......................... G06F 13/00; G06F 13/10
(52) U.S. Cl. ....................... 710/240; 710/305; 710/300; 709/208
(58) Field of Search ............................ 710/240, 2, 305, 710/5, 107, 63, 105, 64, 300; 709/200, 208, 232, 253; 370/463, 402; 340/286.02; 375/220; 700/3

(56) References Cited

U.S. PATENT DOCUMENTS

| | | |
|---|---|---|
| 4,250,563 A | 2/1981 | Struger |
| 4,504,927 A | 3/1985 | Callan |
| 4,815,034 A | 3/1989 | Mackey |
| 4,882,702 A | 11/1989 | Struger et al. |
| 5,047,922 A | 9/1991 | Borker |
| 5,528,621 A * | 6/1996 | Heiman et al. |
| 5,548,788 A * | 8/1996 | McGillis et al. |
| 5,590,292 A | 12/1996 | Wooten et al. |
| 5,603,051 A | 2/1997 | Ezzet |
| 5,619,722 A | 4/1997 | Lovrenich |
| 5,628,637 A | 5/1997 | Pecone et al. |
| 5,758,099 A | 5/1998 | Grieco et al. |
| 5,884,027 A * | 3/1999 | Garbus et al. |
| 6,542,951 B1 * | 4/2003 | Sangveraphunski et al. |

* cited by examiner

Primary Examiner—Gopal C. Ray
(74) Attorney, Agent, or Firm—Lathrop & Gage, L.C.

(57) ABSTRACT

An intelligent host adapter for coupling a host PC to peripheral I/O devices through I/O channels wherein the host adapter has a master/slave architecture. A master I/O processor includes circuits for coupling the host adapter to a slot in an I/O interface bus of the host PC such as a PCI bus. The master I/O processor also includes circuits for a relatively small fixed number of I/O channels for connection to associated I/O peripheral busses such as SCSI, Fiber Channel and networks (i.e., Ethernet, token ring, etc.). A slave I/O processor is coupled to the master I/O processor via a dedicated master/slave interface bus. The slave I/O processor provides for addition of I/O channels to the host adapter without requiring use of additional slots of the I/O interface bus of the host PC and without using associated I/O computing resources within the host PC.

24 Claims, 3 Drawing Sheets

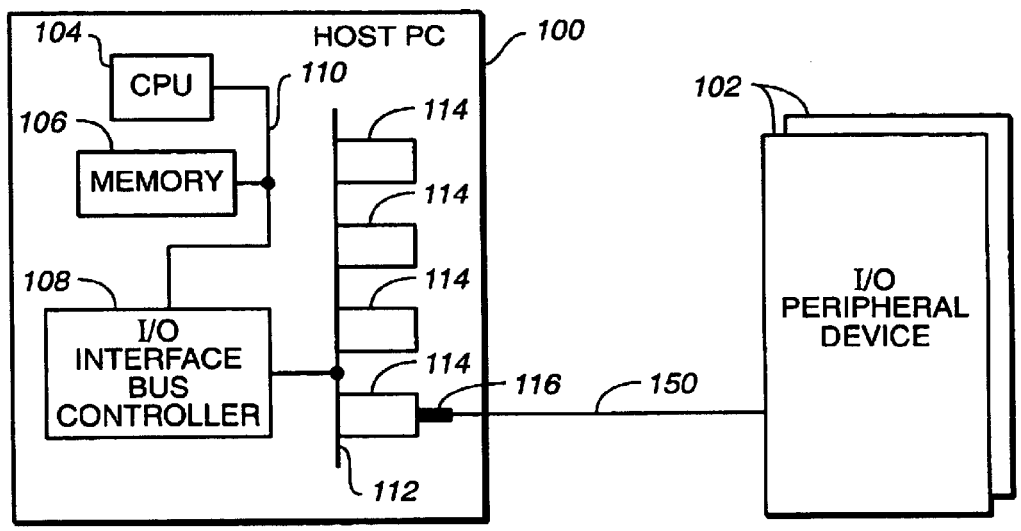
FIG._1
*(PRIOR ART)*
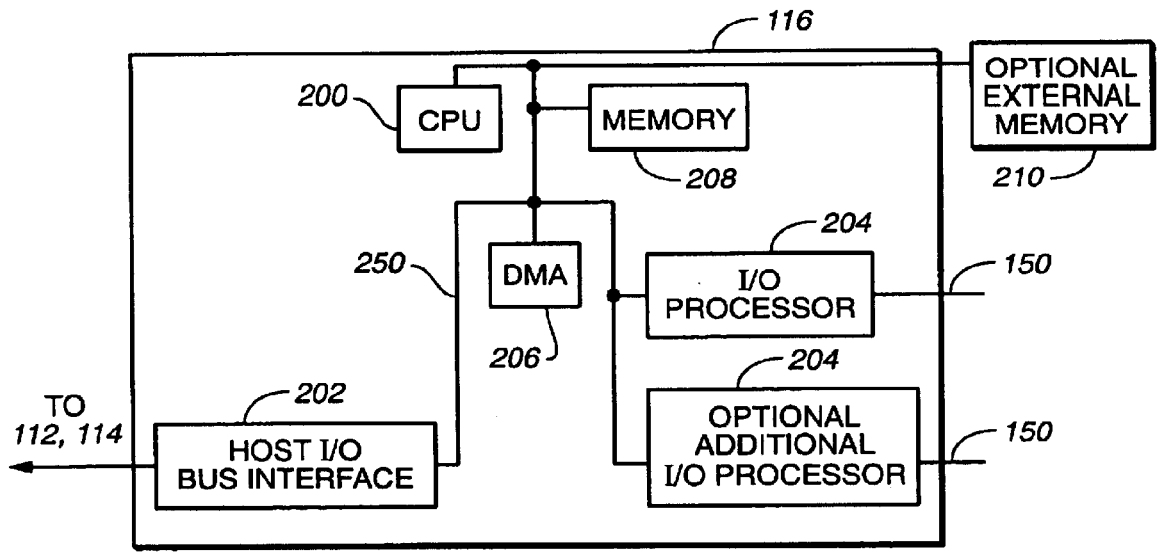
FIG._2
*(PRIOR ART)*

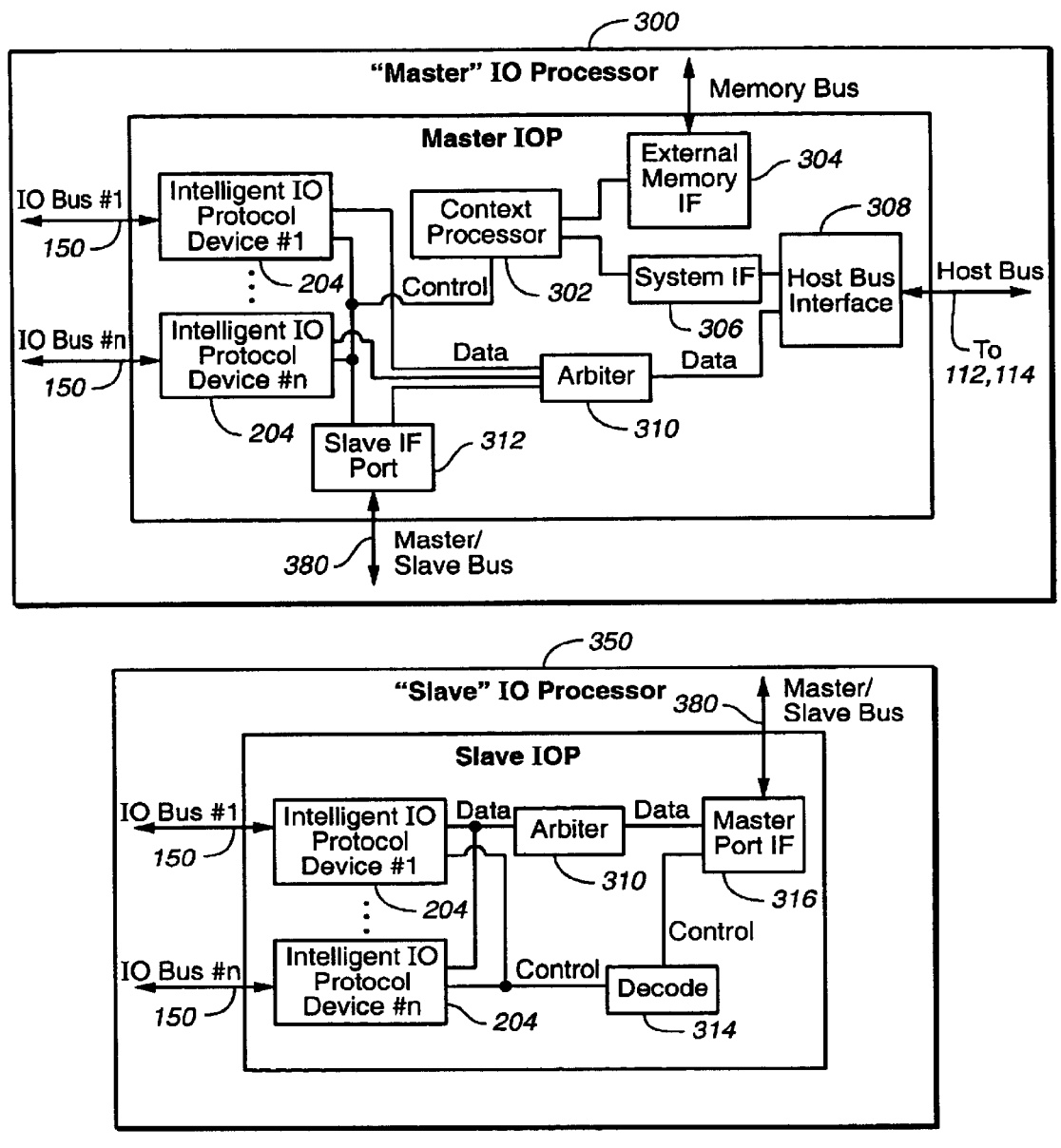
FIG._3

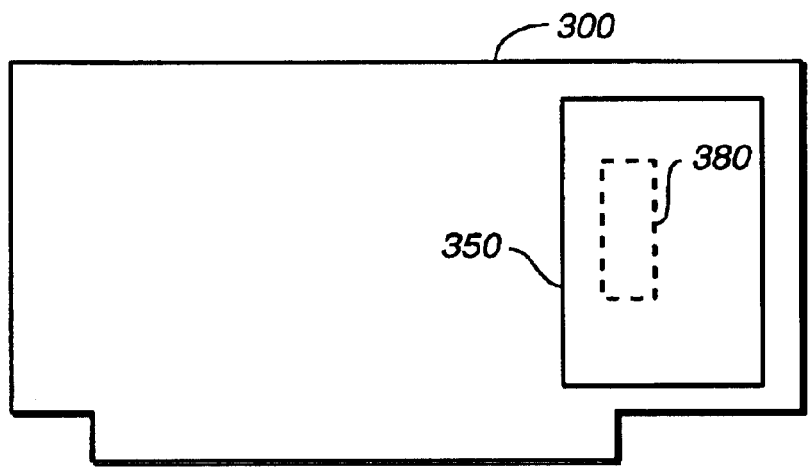
FIG._4
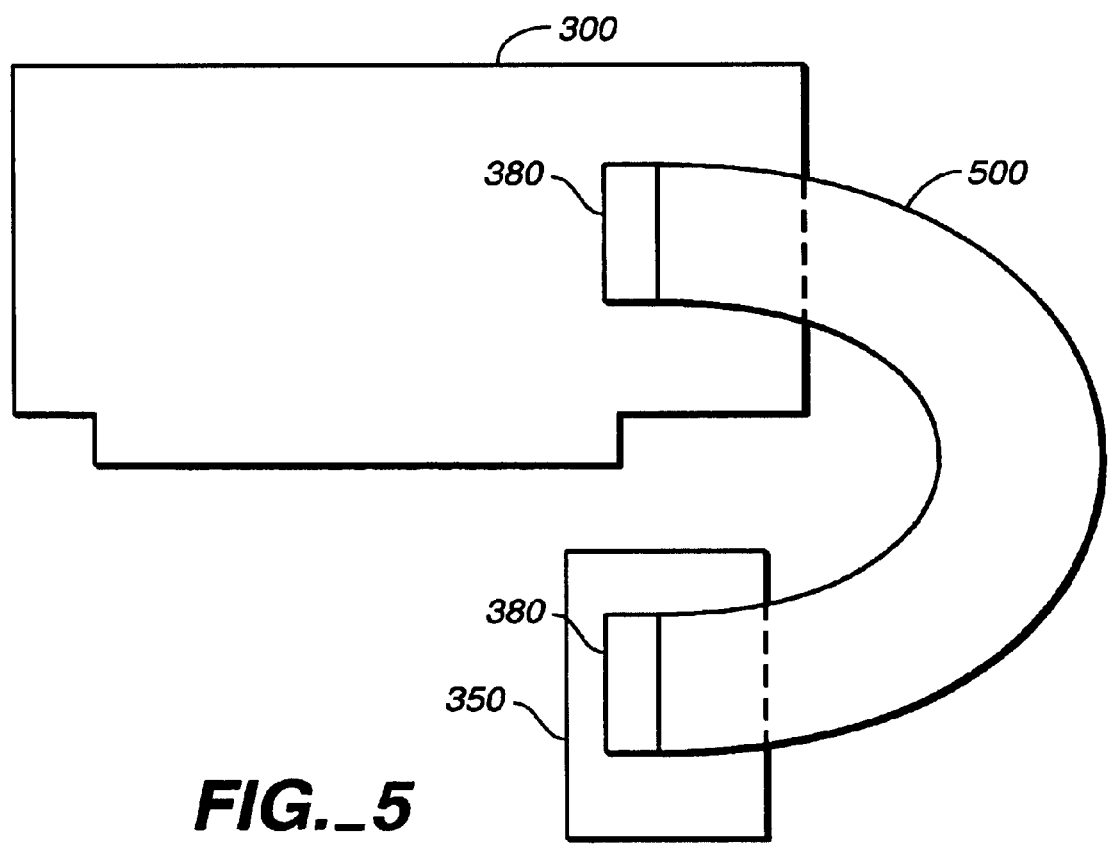
FIG._5

METHODS AND SYSTEMS FOR INTELLIGENT I/O CONTROLLER WITH CHANNEL EXPANDABILITY VIA MASTER/SLAVE CONFIGURATION

BACKGROUND OF THE INVENTION

1. Field of the Invention

The invention relates generally to an architecture for host I/O adapters as generally practiced in present computing workstations and personal computers and relates more specifically to a master/slave configuration architecture that provides enhanced flexibility for adding I/O channel capabilities to an I/O adapter without requiring additional host I/O slots.

2. Description of Related Art

Present day computing workstations and personal computers (collectively referred to herein as "PCs") interact with peripheral I/O devices through host I/O adapters. Typically, a PC includes an I/O interface bus into which host I/O adapters applied. ISA, EISA, PCI, and others are exemplary of such I/O interfacing buses commonly used in present day PCs. Host adapter cards are plugged into the I/O interface bus and adapt signals from the host I/O interface bus to appropriate signal values for the particular peripheral I/O device or devices attached to the host adapter. For example, a SCSI host adapter plugs into the I/O interface bus of its host PC and provides connection to a SCSI bus on which one or more peripheral I/O devices are attached. Similarly, a fiber Channel host adapter plugs into a slot in the I/O interface bus up its host PC and provides a connection for that PC to a fiber Channel communication medium. Such adapters converge signals from, for example, a PCI I/O interface bus into appropriate signals for the SCSI bus or fiber Channel communication medium and vice versa.

Host adapters as presently known in the art generally include significant processing power to permit the host adapter to perform substantial processing of I/O transactions thereby offloading the processing capabilities of the host PC. Often a host adapter will include a general purpose microprocessor as well as one or more special-purpose I/O channel processors for coupling the adapter to the host I/O interface bus and for coupling the adapter to the I/O peripheral devices (such as SCSI, USB, Ethernet, Fibre Channel, etc.). A single host adapter may include multiple such special-purpose I/O channel processors to permit connection of additional I/O peripheral devices. For example, a single SCSI host adapter may have a single special-purpose I/O channel processor for connection to a host PC PCI bus and multiple special-purpose I/O channel processors for connecting the host adapter to multiple SCSI buses.

Regardless of the number of such special-purpose I/O channel processors for connection to I/O peripheral devices (often referred to as "I/O channels"), present day host adapters have some fixed limit to the number of I/O channels supported by the host adapter interface card. To provide additional I/O channel connections for the host PC, additional duplicate host adapters must be added to the host PC. Each such additional duplicate host adapter utilizes another slot in the host PCI's interface bus. For example, a single SCSI host adapter may provide connections for one or two SCSI interface peripheral buses. To provide additional connections for a host PC to SCSI interface peripheral buses, additional host adapters must be added—each utilizing an additional PCI I/O interface bus slot in the host PC.

Each additional host adapter added to a host PC utilizes an additional slot in the I/O interface bus of the host PC and, in turn, utilizes additional resources within the host PC (i.e., computing resources such as I/O addresses and interrupt IRQs). It is evident from this discussion that a need exists for an improved I/O adapter architecture that permits flexible expansion of I/O channels supported by the host I/O adapter without a over utilizing host PC resources such as I/O interface bus slots and other I/O related computing resources.

SUMMARY OF THE INVENTION

The present invention solves the above and other problems, thereby advancing the state of the useful arts, by providing a host I/O adapter architecture that utilizes a master/slave configuration. A host adapter in accordance with the present invention is designated as a master device (also referred to herein as master host adapter or master I/O processor) and includes all processing features of a host adapter as presently known in the art. In addition, the master host adapter of the present invention includes a slave port interface support to communicate with a slave I/O processor. The slave I/O processor of the present invention is a dramatically simplified device relative to the master host adapter. The slave I/O processor includes additional special-purpose I/O channel processors to provide additional I/O channels for the master I/O processor. The slave I/O processor also includes a master port interface to connect to the master I/O processor through its slave port interface. A master/slave bus connects the slave port interface of the master I/O processor and the master port interface of the slave I/O processor to permit communications between the master I/O processor and slave I/O processor. Notably, the slave I/O processor is preferably devoid of a general purpose microprocessor and host bus interface ports. Further, the slave I/O processor is preferably substantially devoid of memory associated with the general purpose microprocessor of the master I/O processor.

The master/slave I/O processor architecture of the present invention permits addition of I/O channels to the master I/O processor without utilizing an additional host PC I/O interface bus slots and associated computing resources in the host PC. In a first preferred embodiment, slave I/O processors are connected to the master I/O processor in a "daughter board" physical configuration. In alternative embodiments, the slave I/O processor may be physically mounted remote from the master I/O processor with appropriate interconnect cabling serving as the master/slave bus for communications between the master I/O processor and slave I/O processor. In all embodiments, the slave I/O processor imposes no burden on the resources of the host PC in that it is not required to be mounted in a host PC I/O interface bus slot and does not consume any related I/O resources of the host PC. Further, the slave I/O processor is substantially simpler than the master I/O processor to thereby reduce the cost of adding he additional I/O channels in a host PC.

The present invention is particularly well-suited for interfacing a PCI bus in a host computer with multiple SCSI or Fibre Channel I/O peripheral buses connected to peripheral components such as data storage subsystems.

The above and other aspects, features, and advantages of the present invention will become apparent from the following description and the attached drawings.

BRIEF DESCRIPTION OF THE DRAWINGS

FIG. 1 is a block diagram of a conventional computer system with a host adapter as presently practiced in the art connecting the computer system to a peripheral device.

FIG. 2 is a block diagram of the host adapter of FIG. 1 as presently known in the art.

FIG. 3 is a block diagram of an improved host adapter in accordance with the present invention wherein a master I/O processor is coupled with one or more slave I/O processors for management of additional I/O channels.

FIG. 4 is a block diagram depicting a first exemplary preferred embodiment of the master and slave I/O processors of the present invention wherein the slave I/O processor is physically mounted to the master I/O processor as a daughter board.

FIG. 5 is a block diagram depicting a second exemplary preferred embodiment of the master and slave I/O processors of the present invention wherein the slave I/O processor is physically mounted remote from the master I/O processor and is electronically coupled via a interconnect cable.

DETAILED DESCRIPTION OF THE PREFERRED EMBODIMENTS

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 is a block diagram of a conventional computer system 100 in which a host adapter 116 as presently practiced in the art adapts signals as required for exchanging information via I/O bus 150 between computer system 100 and I/O peripheral devices 102. As noted above, I/O bus 150 may be any of several well-known I/O peripheral bus architectures including, for example, SCSI, Fibre Channel, USB, etc. CPU 104 executes programmed instructions stored in a local memory 106. Such program execution often involves input/output operations to peripheral devices 102. Host PC 100 accesses such I/O peripheral devices 102 through an I/O interface bus 112. I/O interface bus 112 typically includes a number of "slots" 114 in which host adapters 116 may be inserted to adapt signals between the processor bus I/O within host PC 100 and appropriate I/O busses 150 adapted to interface to particular I/O peripheral devices 102.

Each host adapter 116 as presently practiced in the art occupies one slot 114 of I/O interface bus 112 in host PC 100. As noted above, I/O interface bus 112 may be any of several well-known standard I/O bus interfaces including, for example, a PCI bus.

As noted above, host adapter 116 as presently practiced in the art occupies one slot 114 in I/O interface bus 112. Available slots 114 in such an I/O interface bus 112 are often a valuable resource within host PC 100. Further, in general, each host adapter 116 plugged into a slot 114 of I/O interface bus 112 consumes other related I/O resources within host PC 100 such as interrupt request lines (IRQs) and I/O addresses.

Each host adapter 116 plugged into a slot 114 of I/O interface bus 112 provides for a limited number of I/O channels to adapt signals to a particular I/O bus 150. As presently practiced in the art the number of I/O channels supported by a host adapter may be variable but there exists a fixed maximum number of such channels supported by the host adapter 116. Support for additional I/O channels in host PC 100 requires the insertion of additional host adapters 116—each occupying a slot 114 in I/O interface bus 112 of host PC 100.

Those skilled in the art will recognize that the block diagram of FIG. 1 is intended as broadly representative of typical host computing systems as presently known in the art. Key to such present systems is the use of host adapters 116 plugged into slots 114 of an I/O interface bus 112 within the host PC 100. Further, each such host adapter uses other I/O resources within host PC 100.

FIG. 2 is a block diagram showing additional details of host adapter 116 as presently practiced in the art. In general, presently known host adapters 116 include a general purpose processor CPU 200 to control and coordinate overall operation of the host adapter 116 and to provide processing power to offload I/O processing responsibilities from the CPU 102 of host PC 100. CPU 200 of host adapter 116 accesses local memory 208 and optional external memory 210 via processor bus 250. Host I/O bus interface 202 adapts signals provided on processor bus 250 for exchange with the host PC via slot 114 and I/O interface bus 112 of FIG. 1. I/O processors 204 (also referred to herein as special purpose processors) adapt signals provided on processor bus 250 for exchange with I/O peripheral devices via I/O peripheral bus 150. Typically, a direct memory access controller 206 (DMA) provides enhanced performance for transferring large volumes of information among the various components within host adapter 116. Specifically, DMA 206 provides for high-speed data transfers among various sources and destinations for movement of data within host adapter 116 including: memory 208, memory 210, host I/O bus interface 202 and I/O processors 204.

As noted above, a plurality of I/O processors 204 may be designed into host adapter 116 as presently practiced in the art. As shown in FIG. 2, a first I/O processor 204 and a second optional I/O processor 204 are provided to increase the number of I/O channels managed by host adapter 116. Though the actual number of such I/O processors 204 in a host adapter 116 may be variable, as presently practiced in the art a relatively small fixed maximum number of I/O processors are used in a single host adapter 116. For example, a pair of SCSI I/O processors 204 may be designed into a single host adapter 116 to permit a single SCSI host adapter to control and manage SCSI I/O peripheral buses. If additional I/O channels are required in the host PC, additional host adapters 116 as presently practiced in the art are added to other available slots 114 of I/O interface bus 112 of the host PC. As noted, slots 114 and other related computing resources are often scarce and hence valuable in a host PC. It is desirable as noted above to permit flexible addition of I/O channels in a host PC without over utilizing scarce resources such as available I/O slots and related I/O computing resources.

FIG. 3 is a block diagram of a master host adapter 300 and associated slave I/O processor 350. The general architecture of master I/O processor 300 is similar to that of host adapter 116 in that a fixed, relatively small number of a I/O processors 204 are designed into master I/O processor 300. Additionally, as presently known in the art, master I/O processor 300 preferably includes a single host I/O bus interface 308 for adapting signals between master host adapter 300 and the host PC via slot 114 and host I/O interface bus 112.

As distinct from the present state of the art typified by host adapter 116 of FIG. 1, master I/O processor 300 includes a slave interface port 312 for communications with slave I/O processor 350 via master/slave bus 380.

Slave I/O processor 350 is connected to master I/O processor 300 and exchanges signals there with via master/ slave bus 380. Slave I/O processor 350 includes master interface port 316. Master interface port 316 of slave I/O processor 350 and slave interface port 312 of master I/O processor 300 coordinate and control the exchange of information between master I/O processor 300 and slave I/O processor 350. Slave I/O processor 350 includes additional I/O processors 204 to permit management of additional I/O channels and associated I/O peripheral buses 150.

Unlike master I/O processor 300, slave I/O processor 350 is preferably of a general purpose processor (CPU) and associated memory. Neither does slave I/O processor 350 include circuitry for adapting to the host I/O interface bus 112. Rather, slave I/O processor 350 is controlled entirely by master I/O processor 300. In essence, slave I/O processor 350 is an extension of the master I/O processor 300 to provide for flexible and scalable management of additional I/O channels through additional I/O processors 204 of slave I/O processor 350. Both master I/O processor 300 and slave I/O processor 350 include well-known circuits for bus arbitrations (arbiter 310). Those skilled in the art will recognize the common need for arbitration in the exchange of information between one of several I/O processors 204 and the host bus interface 308. Exchange of information between a selected one of the I/O processors 204 (either on the master or slave I/O processor 300 or 35, respectively) and the single host bus interface 308 requires coordination and mutual exclusion of other I/O processors 204. The bus arbiter 310 in both the master I/O processor 300 and the slave I/O processor 350 performs this well known function to coordinate the communications. Decode 314 in slave I/O processor performs the function of decoding addresses provided on the control portion of the master/slave bus 380 for selecting an appropriate one of the I/0 processors 204 on the slave I/0 processor 350. Well-known address decode circuits provide this feature.

The master/slave bus 380 is an appropriate bus selected from any of several well-known choices for such a bus. The preferred bus for a particular embodiment of the present invention is that which is preferred for high-speed access in conjunction with the particular components selected for the design. In the preferred embodiment of the invention, CPU 200 is an ARM processor and the master/slave bus 380 is an ARM compatible AHB bus. Those skilled in the art will recognize a wide variety of equivalent selections for implementing the CPU and master/slave interface bus in the structures of the present invention. The data portion of the master/slave interface bus 380 is preferably a high-speed data bus for exchange of large volumes of data between the master I/O processor 300 and the slave I/O processor 350. Such a high-speed bus would preferably have a wide data path such as 64 bits to enable movement of large volumes of data with relatively lower clock rates. The control portion of the mater/slave interface bus 380 need not be particularly high-speed because the volume of transactions on the control portion of the bus is not particularly high. The control portion provides simple addressing and handshake controls to enable the high-speed transfer of information over the data portion of the master/slave interface bus 380.

As noted above, the master and slave I/O processors may be physically configured for mounting in a variety of manners. The master I/O processor preferably occupies a standard slot in the I/O interface bus of the host PC. Key to the invention is the fact that the slave I/O processor does not require a slot 114 in the host PC's I/O interface bus 112 (nor does the slave I/O processor require associated I/O computing resources). FIGS. 4 and 5 depict typical physical mounting and interconnect features for mounting and coupling of master and slave I/O processors.

In FIG. 4, slave I/O processor 350 is physically attached directly to master I/O processor 300. Master/slave bus 380 is coupled between the master I/O processor and slave I/O processor using standard, mated rigid connectors attached to each of master I/O processor and slave I/O processor. In the alternative, FIG. 5 depicts master I/O processor 300 and slave I/O processor 350 wherein master/slave bus 380 is connected between the master and slave I/O processors via a standard cable 500 such as a ribbon cable. In this alternative embodiment, slave I/O processor 350 may be physically mounted anywhere within host PC and need not be immediately adjacent the master I/O processor 300.

FIGS. 4 and 5 show a single slave I/O processor coupled to a master I/O processor via the master/slave interface bus. Those skilled in the art will recognize simple design choice in the master/slave interface bus that permit multiple slave I/O processor elements to be coupled to a single master I/O processor. Such multiple slave I/O processor may be connected in parallel to an appropriate master/slave interface bus or may be daisy-chained on the master/slave interface bus. Such design choices are well-known to those skilled in the art.

Those skilled in the art will readily recognize extensions to the circuits described above with respect to FIG. 3 to enable such multiple slave I/O processors to be configured in association with a single master I/O processor. Such multi-drop arbitration and addressing techniques to extend the number of such slave I/O processors are well known in the art.

While the invention has been illustrated and described in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A host I/O adapter comprising:
    a master I/O processor comprising:
        a general purpose processor;
        a host bus interface coupled to said general purpose processor for coupling said master I/O processor to a host PC I/O interface bus;
        a first special purpose processor for coupling said master I/O processor to a peripheral I/O bus; and
        a slave interface port and
    a slave I/O processor coupled to said master I/O processor through said slave interface port, said slave I/O processor comprising:
        a master interface port for coupling said slave I/O processor to said slave interface port of said master I/O processor; and
        a second special purpose processor for coupling said slave I/O processor to a peripheral I/O bus, wherein said slave I/O processor is not directly coupled to a host PC I/O interface bus.

2. The host I/O adapter of claim 1 wherein said slave I/O processor is devoid of a host bus interface for interfacing with a host PC I/O interface bus.

3. The host I/O adapter of claim 1 wherein said slave I/O processor is devoid of a general purpose processor.

4. The host I/O adapter of claim 1 wherein the host PC I/O interface bus is a PCI bus.

5. The host I/O adapter of claim 1 wherein the peripheral I/O bus is a parallel SCSI bus.

6. The host I/O adapter of claim 1 wherein the peripheral I/O bus is a Fibre Channel communication medium.

7. The host I/O adapter of claim 1 wherein the peripheral I/O bus is a network communication medium.

8. A system comprising:
- a host PC having a host I/O interface bus wherein said host I/O interface bus includes a plurality of slots for receiving host adapters;
- a master host adapter inserted in a slot of said plurality of slots of said host I/O interface bus and electronically coupled to said host PC through said slot wherein said master host adapter includes a first set of I/O channels for coupling said host PC to peripheral I/O devices through associated peripheral I/O busses and wherein said host adapter includes a master/slave bus, distinct from said host I/O interface bus and distinct from said peripheral I/O busses, for coupling said master host adapter to a slave host adapter; and
- a slave I/O processor coupled to said master/slave bus wherein said slave I/O processor is not inserted in a slot of said plurality of slots and is devoid of direct connection to said host I/O interface bus and wherein said slave I/O processor includes a second set of I/O channels for coupling said host PC to peripheral I/O devices through associated peripheral I/O busses.

9. The system of claim 8 wherein said slave I/O processor is devoid of a general purpose processor.

10. The system of claim 8 wherein the host I/O interface bus is a PCI bus.

11. The system of claim 8 wherein the peripheral I/O bus is a parallel SCSI bus.

12. The system of claim 8 wherein the peripheral I/O bus is a Fibre Channel communication medium.

13. The system of claim 8 wherein the peripheral I/O bus is a network communication medium.

14. A master I/O processor usable in a host computer system, said master I/O processor comprising:
- a general purpose processor configured for controlling one or more special purpose processors of a slave I/O processor to perform I/O operations;
- a host bus interface coupled to said general purpose processor for coupling said master I/O processor to a host PC I/O interface bus; and
- a slave interface port coupled to the general purpose processor for coupling said master I/O processor to the slave I/O processor.

15. The master I/O processor of claim 14 wherein the host PC I/O interface bus is a PCI bus.

16. The master I/O processor of claim 14 further comprising:
- a first special purpose processor for coupling said master I/O processor to a peripheral I/O bus.

17. A slave I/O processor comprising:
- a master interface port for coupling said slave I/O processor to a corresponding slave interface port of a master I/O processor adapted to be coupled to a host PC I/O interface bus and wherein said slave I/O processor is devoid of any direct connection to a host PC I/O interface bus; and
- a plurality of special purpose processors for coupling said slave I/O processor to a peripheral I/O bus wherein a host PC indirectly accesses said plurality of special purpose processors through a master I/O processor and coupled to said master interface port.

18. The slave I/O processor of claim 17 wherein said slave I/O processor is devoid of a general purpose processor.

19. The slave I/O processor of claim 17 wherein the peripheral I/O bus is a parallel SCSI bus.

20. The slave I/O processor of claim 17 wherein the peripheral I/O bus is a Fibre Channel communication medium.

21. The slave processor of claim 17 wherein the peripheral I/O bus is a network communication medium.

22. A host I/O adapter comprising:
- a master I/O processor comprising:
  - a general purpose processor;
  - a host bus interface coupled to said general purpose processor for coupling said master I/O processor to a host PC I/O interface bus; and
  - a slave interface port; and
- a slave I/O processor coupled to said master I/O processor through said slave interface port, said slave I/O processor comprising:
  - a master interface port for coupling said slave I/O processor to said slave interface port of said master I/O processor; and
  - a special purpose processor for coupling said slave I/O processor to a peripheral I/O bus, wherein said slave I/O processor is not directly coupled to a host PC I/O interface bus.

23. The host I/O adapter of claim 22 wherein said slave I/O processor is devoid of a host bus interface for interfacing with a host PC I/O interface bus.

24. The host I/O adapter of claim 22 wherein said slave I/O processor is devoid of a general purpose processor.

* * * * *